United States Patent [19]

Christian et al.

[11] Patent Number: 4,531,712

[45] Date of Patent: Jul. 30, 1985

[54] CYCLE REPAIR STAND

[76] Inventors: Eric E. Christian; George Spector, both of c/o George Spector 3615 Woolworth Bldg. 233 Broadway, New York, N.Y. 10007

[21] Appl. No.: 534,304

[22] Filed: Sep. 21, 1983

[51] Int. Cl.³ .................................... B60P 1/16

[52] U.S. Cl. .................................... 254/88

[58] Field of Search .................... 254/88; 211/17, 21, 211/22; 312/201, 202, 250, 277, DIG. 33

[56] References Cited

U.S. PATENT DOCUMENTS

| | | | |
|---|---|---|---|
| 1,408,408 | 2/1922 | Scott | 254/88 |
| 2,012,635 | 8/1935 | Paden | 254/88 |
| 3,863,890 | 2/1975 | Ruffing | 254/88 |
| 4,054,338 | 10/1977 | Martin | 312/250 |
| 4,077,607 | 3/1978 | Lovelady | 254/88 |
| 4,294,348 | 10/1981 | Hastings | 312/DIG. 33 |
| 4,442,961 | 4/1984 | Bott | 211/22 |

*Primary Examiner*—Robert C. Watson

[57] ABSTRACT

A repair stand for motorcycles and the like is provided and consists of a rectangular base member, a pair of hollow cast members, a platform member and a ramp member. The hollow cast members each have a tire well to support a tire of a motorcycle and are hinged to the base member to be placed in a storage position or a work position. The platform member is placed between the hollow cast members when the hollow cast members are in the work position, while the ramp member is attached to either of the hollow cast members for permitting the motorcycle to be brought onto the pair of hollow cast members for repair and removal from the pair of hollow cast members when repair is completed.

6 Claims, 3 Drawing Figures

CYCLE REPAIR STAND

BACKGROUND OF THE INVENTION

The instant invention relates generally to repair stands and more specifically relates to a repair stand for motorcycles and the like.

When a motorcycle or moped has to be serviced and repaired a person has to assume awkward and uncomfortable positions while bending over the equipment to perform different tasks. This situation is not desirable so accordingly it is in need of an improvement.

SUMMARY OF THE INVENTION

A principle object of the present invention is to provide a repair stand for motorcycles and the like that is constructed to elevate motorcycles or mopeds to a comfortable position.

Another object is to provide a repair stand for motorcycles and the like that is conveniently movable to different locations.

An additional object is to provide a repair stand for motorcycles and the like that has a tray to clean parts, a tool chest and a jack stand.

A further object is to provide a repair stand for motorcycles and the like that is simple and easy to use.

A still further object is to provide a repair stand for motorcylces and the like that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, that that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
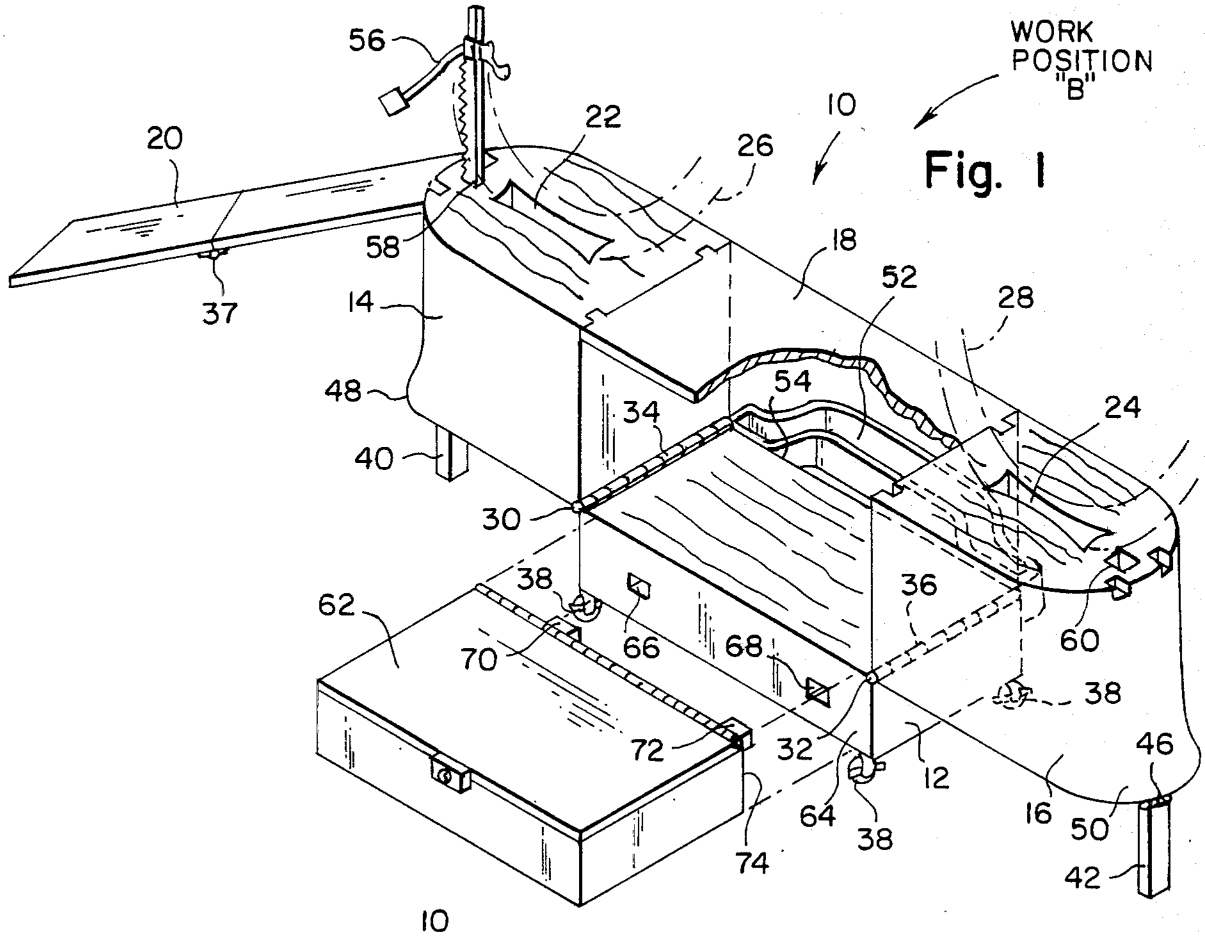
FIG. 1 is a perspective view of the invention.
Figure 2:
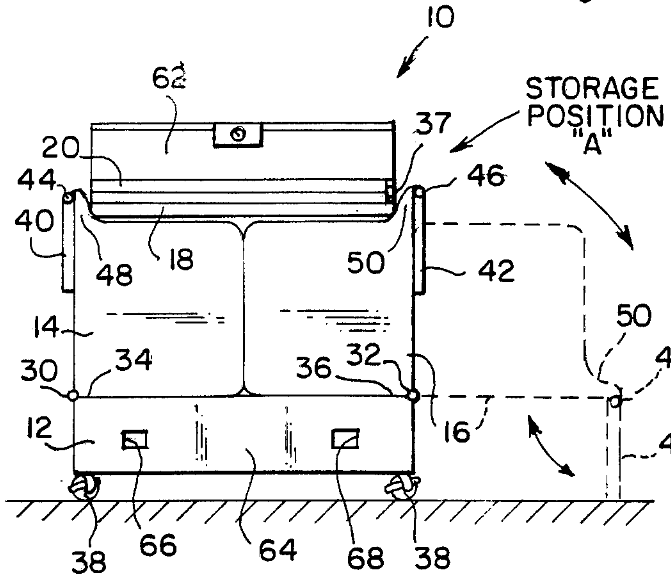
FIG. 2 is a front elevational view of the invention in a storage position.

Turning now descriptively to the drawings, in which similar reference characters denote similar elements throughout the several views, FIGS. 1 and 2 illustrates a repair stand 10 for motorcylces and the like. The stand 10 basically consists of a rectangular base member 12, a pair of hollow cast members 14 and 16, a platform member 18 and a ramp member 20.

The pair of hollow cast members 14 and 16 each have a tire well 22 and 24 to support a tire 26 and 28 of a motorcycle and hinged at one end 30 and 32 to an opposite short side 34 and 36 of the base member 12. The hollow cast members 14 and 16 can be placed in a storage position "A" (see FIG. 2) by being turned inwardly over the base member 12 and can be placed in a work position "B" (see FIG. 1) by being turned outwardly away from the base member 12.

The platform member 18 is placed between the hollow cast members 14 and 16 when the hollow cast members 14 and 16 are in the work position "B".

The ramp member 20 is attached to either of the hollow cast members 14 or 16 when the hollow cast members are in the work position "B" for permitting the motorcycle to be brought onto the pair of hollow cast members 14 and 16 for repair and removed from the pair of hollow cast members 14 and 16 when repair is completed. The ramp member 20 is collapsible at 37 for easy storage as shown in FIG. 2.

Four locking wheel casters 38 are mounted to bottom of the base member 12, one at each corner, making the repair stand 10 mobil. A pair of leg members 40 and 42, each pivotally mounted at 44 and 46 to a free end 48 and 50 of each of the hollow cast members 14 and 16 to aid in supporting the hollow cast members 14 and 16 when in the work position "B".

A tray 52 is attached to a long side 54 of the base member 12 to clean parts of the motorcycle. A jack stand 56 is provided that can be mounted to either hollow cast member 14 or 16 at 58 or 60 adjacent the tire well 2 or 24 to remove the tire 26 or 28 and for checking RPM's of the tire 26 or 28.

The repair stand 10 further comprises a tool chest 62 removably attached to the other long side 64 of the base member 12 via apertures 66 and 68 in the base member 12 and plugs 70 and 72 in rear wall 74 of the tool chest 62 (see FIG. 1).

Figure 3:
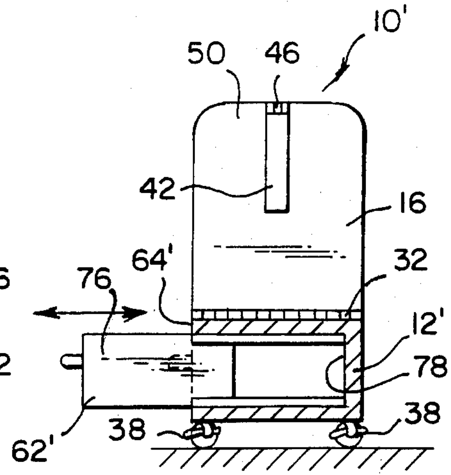
FIG. 3 is a side elevational view of a modification with parts in section.

FIG. 3 shows a modified repair stand 10' wherein the tool chest 62' is still removably attached to the other long side 64' of the base member 12'. The tool chest 62' is a drawer 76 that slides within the base member 12' having an aperture 78 for easy storage.

To use the repair stand 10 one must take it from storage position "A" to work position "B". This is done by removing the tool box 62, the ramp member 20 and the platform member 18. The hollow cast members 14 and 16 can then be turned outwardly away from the base member 12.

The platform member 18 is then placed between the hollow cast members 14 and 16 while the ramp member 20 is opened and attached to either of the hollow cast members 14 or 16. The tray 52 and tool chest 62 are then attached to the base 12. The wheel caster 38 are then locked.

The motorcycle is then brought onto the ramp member 20 over the hollow cast members 14 and 16 and platform member 18 until the wheels 26 and 28 are in the tire wells 22 and 24. The motorcycle is then ready to be repaired.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A repair stand for motorcycles and the like which comprises:
   (a) a rectangular base member;
   (b) a pair of hollow cast members, each hollow cast member having a tire well to support a tire of a motorcycle and hinged at one end to an opposite short side of the base member so that the hollow cast members can be placed in a storage position by being turned inwardly over the base member and can be placed in a work position by being turned outwardly away from the base member;

(c) a platform member placed between the hollow cast members when the hollow cast members are in the work position; and (d) a ramp member attached to either of the hollow cast members when the hollow cast members are in the work position for permitting the motorcycle to be brought onto the pair of hollow cast members for repair and removed from the pair of hollow cast members when repair is completed that further comprises a plurality of locking wheel casters mounted to the bottom of the base member making the repair stand mobile, that further comprises a pair of leg members each pivotally mounted to a free end of each of the hollow cast members to aid in supporting the hollow cast members when in the work position.

2. A repair stand for motorcycles and the like as recited in claim 1, that further comprises a tray attached to a long side of the base member to clean parts of the motorcycle.

3. A repair stand for motorcycles and the like as recited in claim 2, that further comprises a jack stand that can be mounted to either hollow cast member adjacent the tire well to remove the tire and for checking RPM's of the tire.

4. A repair stand for motorcycles and the like as recited in claim 3, wherein the ramp member is collapsible for easy storage.

5. A repair stand for motorcycles and the like as recited in claim 4, that further comprises a tool chest removeably attached to other long side of the base member to be used in repairing the motorcycle.

6. A repair stand for motorcycles and the like as recited in claim 5, wherein the tool chest is removeably attached to the other long side of the base member and is a drawer that slides within the base member having aperture for easy storage.

* * * * *